Aug. 6, 1963     E. H. LYONS, JR     3,100,163
ENERGY CONVERSION PROCESS AND APPARATUS
Filed Sept. 15, 1959
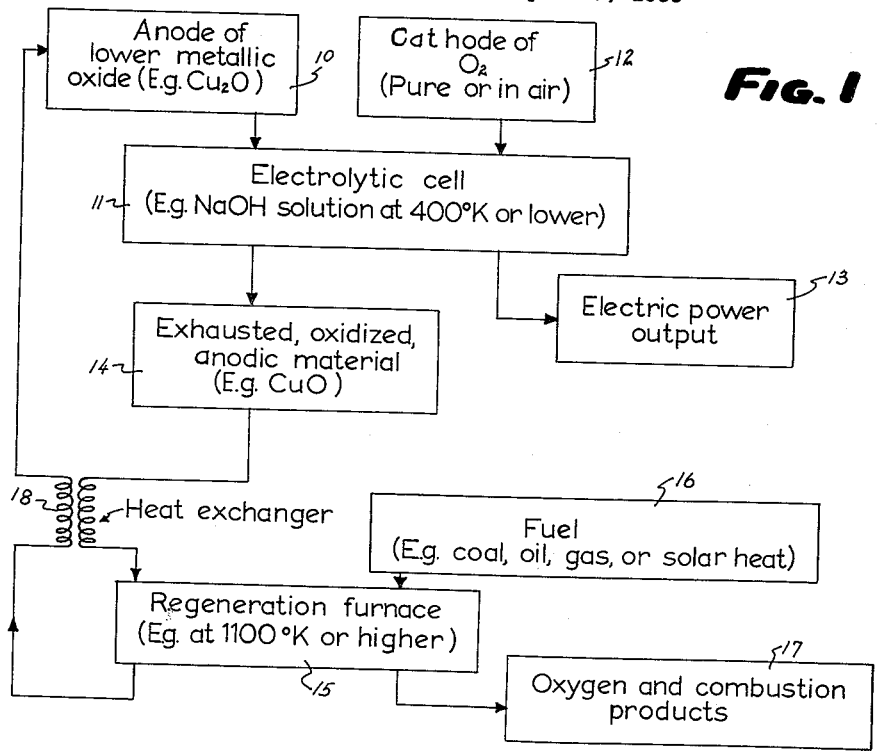
Fig. 1
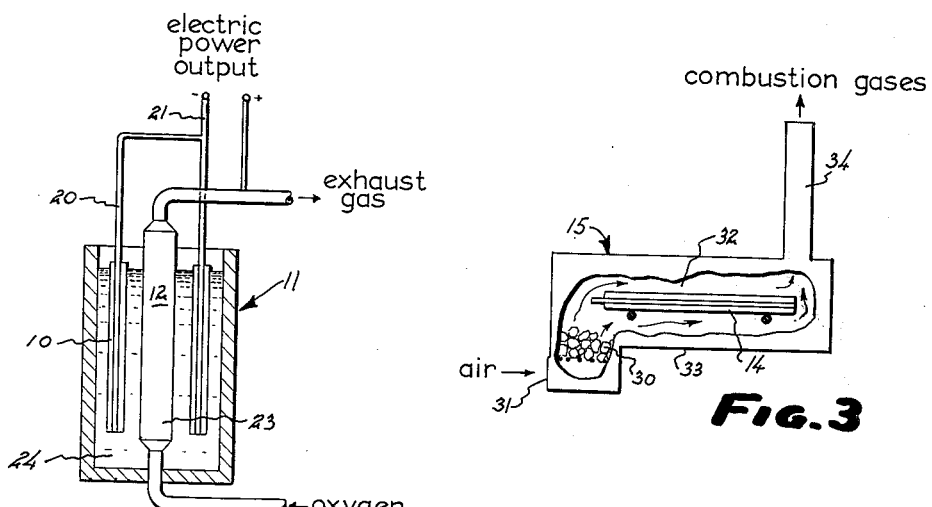
Fig. 2
Fig. 3
INVENTOR.
ERNEST H. LYONS, JR.
BY
ATTORNEY

United States Patent Office 3,100,163
Patented Aug. 6, 1963

3,100,163
ENERGY CONVERSION PROCESS AND
APPARATUS
Ernest H. Lyons, Jr., Elsah, Ill.
Filed Sept. 15, 1959, Ser. No. 840,196
19 Claims. (Cl. 136—86)

This invention relates to an energy conversion process, and particularly to a process wherein certain higher metal oxides are reduced to lower metal oxides, which, in turn, are re-oxidized in an electric cell with an output of electric current. In other words, the net energy conversion is substantially *from* the energy used to reduce the higher oxides *to* the electrical energy produced by the cell.

The present invention is characterized by very high efficiencies of energy conversion. For example, in one form of the invention the higher oxide is reduced by heat at a high temperature, while the electric cell is operated at a much lower temperature. This can be done in a way that gives a theoretical Carnot-cycle efficiency in the neighborhood of 70% to 90%; even when losses within the system are considered, the efficiency may remain fairly close to those figures.

Alternatively, the reduction may, in certain instances, be accomplished chemically by chemical reduction, or by a combination of such methods. When heat is used, the heat may be supplied either by burning fuel, in some cases accompanied by chemical reductive action, by utilizing atomic energy from an atomic pile, or by solar heat, etc.

The present invention differs from direct fuel cells in that the conversion is indirect; and it differs from indirect fuel cells heretofore known in the art by its use of certain metal oxides.

Among the objects of the invention are: to provide a very high efficiency energy-conversion process; to provide a cyclic energy conversion system in which certain basic materials are reutilized repeatedly; to provide an improved system for generating direct-current electricity; to provide an improved type of regenerable electrical cell; and to provide a cell using an oxygen cathode and an anode of one or more of certain metallic oxides.

Other objects and advantages of the invention will appear from the following description of some preferred embodiments thereof.

In the drawings:

FIG. 1 is a flow sheet of a process embodying the principles of the invention.

FIG. 2 is a view in elevation and in section of a simplified form of cell of the type used in the present invention.

FIG. 3 is a view in elevation and partly in section of one type of furnace that may be used in the invention.

The invention is illustrated by the flow sheet, FIG. 1, of a typical process according to the invention. An anode 10 of a lower metallic oxide, such as cuprous oxide, is immersed in an electrolytic cell 11. The electrolyte may be basic (e.g., sodium hydroxide solution) or may be a solution of a mineral acid, provided that the oxides concerned are not excessively soluble therein. The electrolyte is preferably relatively cool or at any rate below 400° K. An oxygen cathode 12 completes the cell, which produces electric power 13 while oxidizing the anode 10.

Exhausted oxidized anodic material 14, such as cupric oxide, is withdrawn from the cell 11 and heated in a regeneration furnace 15, preferably above 1100° K. or typically at about 1500° K. The heat may be supplied principally by fuel 16, such as coal, oil, or gas, or by solar energy, or by atomic energy. The furnace 15 therefore reduces the cupric oxide or other exhausted anodic material, with resultant escape of oxygen and the combustion products, if any, shown at the box 17.

The regenerated material then is cooled and reused as the anode 10. It may be cooled, partially at least, by heat exchange at 18 with the exhausted anodic material 14, thereby reducing fuel cost and gaining further in efficiency. At the same time, any remaining water is evaporated from the material 14.

The keys to this particular process are (1) the choice of the repeatedly regenerated material (e.g. $Cu_2O \rightleftharpoons CuO$), (2) the regeneration at *high* temperature, (3) the use of the cell at *low* temperature, (4) a cheap source of oxygen for the cathode, (5) holding down heat losses at the regeneration step by careful furnace construction and by use of the heat exchanger 18, and (6) the fact that with heat operation the process may describe a true Carnot cycle.

EXAMPLE 1

A typical cell 11 is shown in FIG. 2. The copper oxide anode 10 may be supported on copper bars 20, to which lead wires 21 are attached. In the oxygen electrode 12, air or pure oxygen 22 may be pumped through a tube 23 of porous carbon impregnated with silver. The electrolyte 24 is preferably strongly basic; for example, a 20% aqueous solution of sodium or potassium hydroxide may be used. The internal reactions, while somewhat complex, have the net result that the oxygen reacts with the cuprous oxide to form cupric oxide, with the output of electrical current. The voltage of such a cell, as calculated from the decrease in free energy, is 0.559 volt. Allowing for polarization voltages at the electrodes and the resistance of the electrolyte, the voltage approximates and usually is in excess of 0.500 volts.

FIG. 3 shows one example of a suitable type of furnace 15. Here, coal 30 is burned in air 31 in an offset hearth. The heat and combustion gases 32 flow over, under, and around the exhausted electrode material 14 in a central part 33 of the furnace and are exhausted through a flue 34.

The temperature at which the cuprous oxide is heated in the furnace is important. For example, the approximate changes in enthalpy, free energy, and entropy, calculated for the temperatures of 1111° Kelvin and 298° Kelvin (813° C. and 25° C.) are shown in Table I.

Table I

| Reaction | Enthalpy increase, calories | Free energy increase, calories | Entropy increase, calories per degree |
| --- | --- | --- | --- |
| (1) At 1,111° Kelvin: $2CuO \rightarrow Cu_2O + \tfrac{1}{2}O_2$ | 31,550 | 4,350 | 23.2 |
| (2) Cool $Cu_2O + \tfrac{1}{2}O_2$ from 1,111° K. to 298° K. | −17,870 | | −28.3 |
| (3) At 298° K.: $Cu_2O + \tfrac{1}{2}O_2 \rightarrow 2CuO$ | −34,400 | −25,800 | −27.8 |
| (4) Heat 2CuO from 298° K. to 1,111° K. | 20,700 | | 32.4 |

The increase of free energy (4,350 calories in step (1) above) can be reduced to zero or be made negative by operating at reduced pressure, so that the partial pressure of oxygen is about 1 to 2 mm. Hg.

The net effect of the cycle is thus effectively the absorption of about 32,000 calories of heat at 1111° K. and the release of about 6,000 calories of heat at 298° K., together with about 26,000 calories of electrical energy. Calculated either on the Carnot-cycle or as the calorie-work percentage of output-to-input, the theoretical efficiency is about 74%.

The cupric oxide from the cell does require some heat-evaporization of water. However, it should be noted that it is common to reduce the water content of a precipitate to about 6% by weight through ordinary filtration procedures, and that the heat required to evaporate the water is available from the cooling cuprous oxide, so that a heat-exchange process may be used. Therefore, only small heat losses result, much of the heat for raising the temperature of the cupric oxide being supplied by this heat exchange. Also, a large part of the heat of evaporation may be carried out from the electrolytic cell, if it is run at a temperature near the boiling point of the electrolyte, thus taking advantage of the heat released in operation of the cell.

EXAMPLE 2

The increase in free energy in the first step in Example 1 represents compression of the oxygen from about 4 millimeters to about 0.21 atmosphere. This step may be avoided by using a higher temperature than 1111° K., where the equilibrium partial-pressure of oxygen approaches or exceeds 0.21 atmosphere. For example, Table II shows the results of regeneration at 1300° K.

Table II

| Reaction | Enthalpy increase, calories | Free energy increase, calories | Entropy increase, calories per degree |
|---|---|---|---|
| (1) At 1,300° K.: $2CuO \rightarrow Cu_2O + \frac{1}{2}O_2$ | 32,400 | 800 | 24.2 |
| (2) Cool $Cu_2O + \frac{1}{2}O_2$ from 1,300° K. to 300° K. | −21,000 | | −33.6 |
| (3) At 300° K.: $Cu_2O + \frac{1}{2}O_2 \rightarrow 2CuO$ | −34,400 | −25,800 | −27.8 |
| (4) Heat 2CuO from 300° K. to 1,300° K. | 28,000 | | 37.2 |

By having the temperature of conversion very high, even greater Carnot efficiencies are obtained. Thus, the efficiency of the above operation is about 77%.

The materials 10, 14 which can be utilized in the system of this invention are limited in number. Most metallic oxides are not practical in the system. Only a few are. At present of the metals which are not so expensive as to preclude practical use for the foreseeable future, copper appears to be the most practical, with the conversion of cuprous to cupric oxide and back again quite practical. The metals in periodic groups I-A, II-A, and III-A cannot be used, because they have only one stable oxide, the peroxides and superoxides being quite unstable; moreover, their normal oxides are extremely stable and cannot be dissociated at reasonable temperatures. Similarly, oxides of the non-metals of groups IV-A, V-A, VI-A, and VII-A are not usable.

In group I-B, copper is usable, as stated above. However, silver oxide forms a silver at too low a temperature to enable practical use in such a system, and the oxides of gold are too unstable for use. In group II-B, zinc and cadmium have only one state of oxidation, while mercuric oxide decomposes to mercury at about 400° C., which is too low to give the desired efficiency.

In group III-B the materials whose oxides decompose at reasonable temperatures are too expensive and too rare to be practical.

In group IV the only usable material appears to be lead. $PbO_2$ is reduced at about 400° C. to $Pb_3O_4$, which at about 1000° C. is reduced to PbO. The voltage of a cell using these lead oxides lies between 0.226 and 0.258 volt, which is less desirable than the copper oxide system, but it is a reasonable and practical system.

The oxides of metals in groups V and VI are not usable, due to their stability, their polarization in a cell, and the high voltages required.

In group VII, manganese dioxide decomposes at about 530° C. to give $Mn_2O_3$, and this latter oxide in turn decomposes at about 1000° C., to give $Mn_3O_4$. The $Mn_2O_3$ cell has low voltage, about 0.216, and the low temperature cuts conversion efficiency, but the theoretical voltage of a cell employing $Mn_3O_4$ is 0.589, so that it is a feasible material.

In group VIII, iron and cobalt appear to be usable. $Fe_2O_3$ decomposes at about 1000° C. to $Fe_3O_4$, and the cell will produce about 1.0 volt. There are some difficulties in that, when some $Fe_2O_3$ is dissociated, the remaining $Fe_2O_3$ tends to form a solid solution in $Fe_3O_4$, greatly lowering the dissociation pressure requiring still higher temperatures and, as a result, cutting the voltage sharply.

In alkaline solution, the higher oxidation state of cobalt is $Co(OH)_3$ or $Co_3O_4$. Both of these are said to be dissociated at about 900° to give CoO. The cell voltage approaches about 0.4 volt, depending upon the hydration of the oxide. Cobalt dioxide in alkaline solution would have a low voltage, and it also has a low dissociation pressure, so that it is not a practical anode material.

Thus, it can be seen that, while the copper oxides system is the preferred one, systems utilizing oxides of cobalt, manganese, lead and iron are also usable.

EXAMPLE 3

Lead oxides may be used in an interesting two-step cycle. When $PbO_2$ is heated, it forms $Pb_3O_4$ at about 200° C. or approximately 500° K. When heating is continued, the $Pb_3O_4$ forms PbO at about 500° C. or approximately 800° K. The value of this cycle may be increased by adding a substantial amount (e.g., 1.5%) of calcium hydroxide into the sodium hydroxide electrolyte, for PbO, when oxidized in such a solution, does not decompose appreciably below about 400° C. (about 700° K.), presumably because it forms calcium plumbate rather than $PbO_2$. This increases the efficiency of the cycle. The plumbate may be regarded as containing $PbO_2$.

Table III

| Reaction | Enthalpy increase, calories | Free energy increase, calories | Entropy increase, calories per degree |
|---|---|---|---|
| (1) At 500° K.: $3PbO_2 \rightarrow Pb_3O_4 + O_2$ | 22,100 | 800 | 41.9 |
| (2) Heat $Pb_3O_4$ from 500° to 800° K. | 21,000 | | 19.2 |
| (3) Cool $O_2$ from 500° to 298° K. | −1,480 | | −2.5 |
| (4) At 800° K.: $Pb_3O_4 \rightarrow 3PbO + \frac{1}{2}O_2$ | 20,600 | 100 | 25.0 |
| (5) Cool $3PbO + \frac{1}{2}O_2$ from 800° to 298° K. | −23,000 | | −40.0 |
| (6) At 298° K.: $3PbO + \frac{3}{2}O_2 \rightarrow 3PbO_2$ | −42,000 | −21,900 | −66.8 |
| (7) Warm $3PbO_2$ from 298° to 500° K. | 9,900 | | 24 |

The net result of this cycle is the absorption of about 22,000 calories of heat at 500° K. and 21,000 calories at 800° K., and the liberation of about 22,000 calories of work as electrical energy at 25° C., along with about 20,000 calories of heat. On account of the utilization of heat at two different temperatures, this cycle is especially adaptable to the efficient utilization of heat produced by combustion.

EXAMPLE 4

The system using manganese oxides is illustrated by the following table:

Table IV

| Reaction | Enthalpy increase, calories | Free energy increase, calories | Entropy increase, calories per degree |
|---|---|---|---|
| (1) At 850° K.: $3MnO_2 \rightarrow Mn_3O_4 + O_2$ | 38,100 | 1,200 | 46.3 |
| (2) Cool $Mn_3O_4 + O_2$ from 850° to 298° K. | −26,300 | | −48.8 |
| (3) At 298° K.: $Mn_3O_4 + O_2 \rightarrow 3MnO_2$ | −41,200 | 27,300 | −46.4 |
| (4) Heat $3MnO_2$ from 298° to 850° K. | 27,200 | | 50.2 |

The net effect is the absorption of about 41,000 calories of heat at 550° C., and the production of 27,300 calories of electrical energy and 13,700 calories of heat at 25° C.

EXAMPLE 5

An iron system is also possible, as the approximation in the following table indicates:

Table V

| Reaction | Enthalpy increase, calories | Free energy increase, calories | Entropy increase, calories per degree |
|---|---|---|---|
| (1) At 2,100° K.: $3Fe_2O_3 \to 2Fe_3O_4 + \frac{1}{2}O_2$ | 39,900 | −2,100 | 20.0 |
| (2) Cool $2Fe_3O_4 + \frac{1}{2}O_2$ from 2,100° to 298° K | −222,900 | | −209 |
| (3) At 298° K.: $\frac{1}{2}O_2 + 2Fe_3O_4 \to 3Fe_2O_3$ | −53,700 | −46,500 | −30.0 |
| (4) Heat $3Fe_2O_3$ from 298° to 2,100° K | 265,200 | | 229 |

The net result of this cycle is the absorption of about 54,000 calories of heat at 2100° and the production of 46,000 calories of work as electrical energy at 298°, together with the release of about 9,000 calories of heat.

In practice, apparently the first $Fe_3O_4$ produced exists in solid solution in unchanged $Fe_2O_3$, and the free energy is accordingly reduced. The earlier part of Reaction 1 therefore normally proceeds at lower temperatures than are here specified, and it would be desirable not to carry the reactions to completion, so as to avoid the high temperature otherwise required. This somewhat reduces the efficiency of conversion; nevertheless, as the computation indicates, relatively high efficiency is possible using this system.

Solar energy or atomic energy may be utilized by a suitable heat-exchange program. Still further, chemical reduction may be effected by utilizing carbon monoxide, process gas, hydrocarbons, or water gas, or other reducing agents, to accomplish the reduction from the higher oxides to the lower oxides.

EXAMPLE 6

Since the flue gases from the combustion ordinarily contain some carbon monoxide, this may be used to reduce the oxide at about 300° C. as follows:

Table VI

| Reaction | Enthalpy increase, calories | Free energy increase, calories | Entropy increase, calories per degree |
|---|---|---|---|
| (1) At 600° K.: $2CuO + CO \to Cu_2O + CO_2$ | −33,300 | −32,300 | 5,780 |
| (2) Cool $Cu_2O$ from 600 to 298° K | −6,000 | | −12,000 |
| (3) At 298° K.: $Cu_2O + \frac{1}{2}O_2 \to 2CuO$ | −34,400 | −25,800 | 27,800 |
| (4) Warm 2CuO from 298° to 600° K | 12,400 | | 14,700 |

The net effect of this process is to convert CO to $CO_2$ with the evolution of about 33,000 cal. of heat, at 300° C. and the production of about 25,800 cal. of electrical energy with the evolution of 8600 cal. of heat at 25° C. during the operation of the cell. The process is not a true cycle since the $CO_2$ is discarded. Energetically, it is more attractive when advantage is taken of the heat evolved by Reaction 1; but its real significance lies in its use in combination with the thermal cycle to take advantage of the energy which would otherwise be lost in the escaping CO. In this way, the over-all efficiency of the thermal cycle may be raised to close to theoretical. It should also be observed that, in case unburned residues of hydrogen or hydrocarbons are in the flue gases, they will serve in a similar manner; and that certain combinations of metal oxides selected from the group here enumerated with suitable fuels, especially hydrocarbons, may offer high efficiencies in their own right.

In some of the examples, reactions with an increase in free energy are given for converting the higher oxides into the lower oxides. Such reactions will, of course, not occur spontaneously. However, in each instance except in Example I the increase in free energy is small and may sometimes lie within the range of uncertainty of computations. The computations have been made on the basis of pure oxygen at atmospheric pressure in the furnace, whereas in practice the furnace gases will seldom contain much more than 21% of oxygen (as in air). In some applications of the invention, the gaseous combustion products of the fuel will form the atmosphere in which the reaction takes place; the oxygen content will then be a small fraction of 21%. In other applications, the reaction will be carried out under reduced pressures. The effect of these variations is to lower the partial pressure and therefore the fugacity of the oxygen, and this will produce a decrease in the free energy of reaction so that the reaction will occur spontaneously as written. If this is not sufficient in any instance, the temperature may be raised, perhaps a hundred degrees Kelvin or so, in order to make the free energy change negative and thus cause the reaction to occur spontaneously.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An energy conversion process, comprising the steps of heating at a temperature in excess of 800° K., in the absence of substantial amounts of reducing agents, a metallic higher oxide from the group consisting of CuO, $Co_3O_4$, $MnO_2$, $PbO_2$, $Pb_3O_4$, and $Fe_2O_3$, and mixtures thereof, to convert it to its related and corresponding lower metallic oxide from the group consisting of $Cu_2O$, CoO, $Mn_3O_4$, PbO, and $Fe_3O_4$ and mixtures thereof, cooling said lower oxide to a temperature below about 400° K., immersing said lower oxide in oxygen-transferring electrolyte and using it as an anode therein in cooperation with an oxygen-supplying cathode to produce electric current with resultant reoxidation to said higher oxide, returning said higher oxide to said heating step, and then repeating the process continuously in cycle, so that the energy used to heat said higher oxide is converted at high efficiency into electrical energy.

2. The process of claim 1, wherein said step of cooling lower oxide includes a transfer of heat to said higher oxide as part of said step of heating said higher oxide.

3. An energy conversion process, comprising the steps of: producing electric current with an oxygen-supplying cathode and an anode of lower metallic oxide chosen from the group consisting of $Cu_2O$, CoO, $Mn_3O_4$, PbO, and $Fe_3O_4$ and mixtures thereof immersed in oxygen-transferring electrolyte, said anode thereby being oxidized to a metallic higher oxide from the group consisting of CuO, $Co_3O_4$, $MnO_2$, $PbO_2$, $Pb_3O_4$, and $Fe_2O_3$, and mixtures thereof, taking said higher oxide out of said electrolyte, then reducing said higher oxide to said lower oxide away and apart from said electrolyte at a temperature higher than that of said electrolyte, cooling said lower oxide to approximately the temperature of said electrolyte, and then returning said lower oxide to said step of producing electric current and repeating the process indefinitely, whereby the energy of the electric current so produced is obtained by high-efficiency conversion of the energy supplied in the reducing step.

4. A method for utilizing copper oxides in a continuous high-Carnot-cycle-efficiency operation, comprising the continuously cycling steps of reducing cupric oxide to cuprous oxide at high temperature and at a pressure near atmospheric, and, at a cooler temperature, electrolytically oxidizing said cuprous oxide to cupric oxide while using it as an anode in an electric cell, to produce electric power, and then returning said cupric oxide to said reducing step, said electric power comprising the energy output of the process, while the heat supplied to the reducing step comprises the main energy input of the process.

5. An energy conversion process, comprising heating CuO at a temperature in excess of 1111° K., to convert it to $Cu_2O$, cooling said lower oxide to a temperature of about 300° K., immersing said $Cu_2O$ in a sodium hydroxide solution and using it as an anode therein to produce electric current in cooperation with an oxygen-supplying cathode, with resultant reoxidation to said CuO, returning said CuO to said heating step, and then repeating the process continuously in cycle so that the heat energy used in heating the CuO is, in effect, converted into electrical energy in said electric current at a high efficiency ratio.

6. An energy conversion process, comprising heating $Co_3O_4$ at a temperature in excess of 900° K., to convert it to CoO, cooling said CoO to a temperature below about 400° K., immersing said CoO in oxygen-transferring electrolyte and using it as an anode therein to produce electric current in cooperation with an oxygen-supplying cathode, with resultant reoxidation of said $Co_3O_4$, returning said $Co_3O_4$ to said heating step, and then repeating the process continuously in cycle thereby converting the heat energy supplied to said $Co_3O_4$ into electrical energy in said electric current at a high efficiency ratio.

7. An energy conversion process, comprising heating $MnO_2$ at a temperature in excess of 850° K., to convert it to $Mn_3O_4$, cooling said $Mn_3O_4$ to a temperature below about 300° K., immersing said $Mn_3O_4$ in oxygen-transferring electrolyte and using it as an anode therein in cooperation with an oxygen-supplying cathode to produce electric current with resultant reoxidation to said $MnO_2$, returning said $MnO_2$ to said heating step, and then repeating the process continuously in cycle, whereby the heat energy of said heating step is converted at high efficiency to electrical energy in said electric current.

8. An energy conversion process, comprising heating $PbO_2$ at a temperature in excess of 800° K., to convert it to PbO, cooling said PbO to a temperature below about 300° K., immersing said PbO in oxygen-transferring electrolyte and using it as an anode therein in cooperation with an oxygen-supplying cathode to produce electric current with resultant reoxidation to said $PbO_2$, returning said $PbO_2$ to said heating step, and then repeating the process continuously in cycle, whereby the energy used in heating said $PbO_2$ in converted at high efficiency into electrical energy.

9. An energy conversion process, comprising heating $Fe_2O_3$ at a temperature in excess of 2000° K., to convert it to $Fe_3O_4$, cooling said $Fe_3O_4$ to a temperature below about 300° K., immersing said $Fe_3O_4$ in oxygen-transferring electrolyte and using it as an anode therein in cooperation with an oxygen-supplying cathode to produce electric current with resultant reoxidation to said $Fe_2O_3$, returning said $Fe_2O_3$ to said heating step, and then repeating the process continuously in cycle whereby the energy of heating said $Fe_2O_3$ is converted at high efficiency into electrical energy.

10. A heat engine of high Carnot-cycle efficiency, comprising: a charge of cupric oxide; means for reducing said cupric oxide to cuprous oxide; a voltaic cell having an oxygen cathode and an oxygen-transferring electrolyte, said means for reducing operating at a temperature higher than that of said electrolyte; means for cooling said cuprous oxide to approximately the temperature of said electrolyte; means for introducing said cuprous oxide to said cell and using it as the anode, thereby oxidizing it to cupric oxide; means for withdrawing the resulting cupric oxide from said cell; and means for using said last-mentioned cupric oxide as said initial cupric oxide in a continuous cycle, whereby the energy used to reduce said cupric oxide to cuprous oxide is converted at high efficiency to electrical energy output from said cell.

11. Means for utilizing copper oxides in a continuous high-Carnot-cycle-efficiency operation, comprising the combination of means for reducing cupric oxide to cuprous oxide at high temperature and at pressure near atmospheric, with the consumption of heat energy, electrolytic means for oxidizing said cuprous oxide at a lower temperature to cupric oxide with the resultant production of electrical power, the energy used in reducing said cupric oxide thereby being converted into electrical energy and means for feeding said cupric oxide to said reducing means for re-use therein.

12. An energy conversion system, comprising an electric cell having an oxygen-supplying cathode and an oxygen-transferring electrolyte; means for reducing, at a temperature higher than that of said electrolyte, a metallic higher oxide from the group consisting of CuO, $Co_3O_4$, $MnO_2$, $PbO_2$, $Pb_3O_4$, and $Fe_2O_3$, and mixtures thereof, to its related and corresponding lower metallic oxide from the group consisting of $Cu_2O$, CoO, $Mn_3O_4$, PbO, and $Fe_3O_4$; means for cooling said lower oxide to approximately the temperature of said electrolyte, means for utilizing said lower oxide as the anode in said cell to produce electric current with resultant reoxidation to said higher oxide; and means for returning said higher oxide to said means for reducing, whereby the energy supplied to said oxide by said means for reducing is converted at high efficiency into electrical energy output from said cell.

13. The system of claim 12 wherein said means for cooling comprises heat exchange means for cooling said lower oxide and heating said higher oxide by heat exchange between them.

14. An energy conversion method comprising the continuously cycling steps of: burning fuel with the resultant production of heat and associated chemical reduction, reducing cupric oxide to cuprous oxide by the combination of said heat and chemical reduction; cooling said cuprous oxide to a substantially lower temperature approximately that at which an electrolytic cell utilizing cuprous oxide as an anode operates efficiently; oxidizing said cuprous oxide to cupric oxide electrolytically while using it as the anode of such an electrolytic cell, with the resultant production of electrical power, reheating said cupric oxide by heat exchange with said cooling cuprous oxide, and returning said cupric oxide to said reducing step, whereby the heat energy and chemical reduction energy of said burning fuel are converted at high efficiency into electrical energy.

15. An energy conversion method comprising the continuously cycling steps of: burning fuel with the resultant production of heat and associated chemical reduction; reducing $Co_3O_4$ to CoO by the combination of said heat and chemical reduction; cooling said CoO to a substantially lower temperature approximately that at which an electrolytic cell utilizing CoO as an anode operates efficiently; oxidizing said CoO to $Co_3O_4$ electrolytically while using it as the anode of such an electrolytic cell, with the resultant production of electrical power, reheating said $Co_3O_4$ by heat exchange with said cooling CoO, and returning said $Co_3O_4$ to said reducing step, whereby the heat energy and chemical reduction energy of said burning fuel are converted at high efficiency into electrical energy.

16. An energy conversion method comprising the continuously cycling steps of: burning fuel with the resultant production of heat and associated chemical reduction; reducing $MnO_2$ to $Mn_3O_4$ by the combination of said heat and chemical reduction; cooling said $Mn_3O_4$ to a substantially lower temperature approximately that at which an electrolytic cell utilizing $Mn_3O_4$ as an anode operates efficiently; oxidizing said $Mn_3O_4$ to $MnO_2$ electrolytically while using it as the anode of such an electro-lytic cell, with the resultant production of electrical power, reheating said $MnO_2$ by heat exchange with said cooling $Mn_3O_4$, and returning $MnO_2$ to said reducing step, whereby the heat energy and chemical reduction energy of said burning fuel are converted at high efficiency into electrical energy.

17. An energy conversion method comprising the continuously cycling steps of: burning fuel with the resultant production of heat and associated chemical reduction; reducing $PbO_2$ to PbO by the combination of said heat and chemical reduction; cooling said PbO to a substantially lower temperature approximately that at which an electrolytic cell utilizing PbO as an anode operates efficiently; oxidizing said PbO to $PbO_2$ electrolytically while using it as the anode of such an electrolytic cell, with the resultant production of electrical power, reheating said $PbO_2$ by heat exchange with said cooling PbO, and returning said $PbO_2$ to said reducing step, whereby the heat energy and chemical reduction energy of said burning fuel are converted at high efficiency into electrical energy.

18. An energy conversion method comprising the continuously cycling steps of: burning fuel with the resultant production of heat and associated chemical reduction; reducing $Fe_2O_3$ to $Fe_3O_4$ by the combination of said heat and chemical reduction; cooling said $Fe_3O_4$ to a substantially lower temperature approximately that at which an electrolytic cell utilizing $Fe_3O_4$ as an anode operates efficiently; oxidizing said $Fe_3O_4$ to $Fe_2O_3$ electrolytically while using it as the anode of such an electrolytic cell, with the resultant production of electrical power, reheating said $Fe_2O_3$ by heat exchange with said cooling $Fe_3O_4$, and returning said $Fe_2O_3$ to said reducing step, whereby the heat energy and chemical reduction energy of said burning fuel are converted at high efficiency into electrical energy.

19. A heat engine of high Carnot-cycle efficiency, comprising: a voltaic cell having an oxygen cathode and an oxygen-transferring electrolyte; a charge of metallic oxide chosen from the group consisting of CuO, $Co_3O_4$, $MnO_2$, $PbO_2$, $Pb_3O_4$, and $Fe_2O_3$; heating means for reducing said oxide to a lower oxide at a temperature substantially higher than that of said electrolyte and at substantially atmospheric pressure; means for cooling said lower oxide to approximately the temperature of said electrolyte; means for introducing said cooled lower oxide to said cell and using it as an anode therein, with resultant oxidation to the higher oxide; means for withdrawing said higher oxide from said cell; and means for using said last-mentioned higher oxide as said initial higher oxide in a continuous cycle, whereby the energy supplied by said heating means when reducing said oxide is converted at high Carnot-cycle efficiency into electrical energy.

References Cited in the file of this patent

UNITED STATES PATENTS

| | | |
|---|---|---|
| 344,345 | Case | June 29, 1886 |
| 764,595 | Jone | July 12, 1904 |
| 1,856,386 | Heise | May 3, 1932 |
| 2,901,522 | Bopp | Aug. 25, 1959 |

FOREIGN PATENTS

| | | |
|---|---|---|
| 457 | Great Britain | Jan. 13, 1885 |
| 437,009 | Germany | Jan. 8, 1920 |
| 13,922 | Great Britain | June 20, 1885 |

OTHER REFERENCES

Review of Modern Physics, vol. 4, 1932, pages 756–759.

Sherrer et al.: Thermally Regenerative Ionic Hydride Galvanic Cell, Journal of the Electrochemical Society, page 693, November 1958, vol. 105.